(12) United States Patent
Otterson

(10) Patent No.: US 8,335,547 B2
(45) Date of Patent: Dec. 18, 2012

(54) SYSTEM AND METHOD FOR PROVIDING DISCHARGE AUTHORIZATION TO A BATTERY-POWERED VEHICLE VIA A TELEMATICS SYSTEM

(75) Inventor: Scott W. Otterson, Clinton Township, MI (US)

(73) Assignee: General Motors LLC, Detroit, MI (US)

( * ) Notice: Subject to any disclaimer, the term of this patent is extended or adjusted under 35 U.S.C. 154(b) by 69 days.

(21) Appl. No.: 12/969,918

(22) Filed: Dec. 16, 2010

(65) Prior Publication Data

US 2012/0157083 A1 Jun. 21, 2012

(51) Int. Cl.
*H04M 1/00* (2006.01)
*H04K 3/00* (2006.01)
(52) U.S. Cl. ........... 455/573; 180/65.29; 320/124
(58) Field of Classification Search .......... 455/572–573; 180/65.29; 320/109, 118, 124
See application file for complete search history.

(56) References Cited

U.S. PATENT DOCUMENTS

2009/0177595 A1* 7/2009 Dunlap et al. ............. 705/412
2011/0084665 A1* 4/2011 White et al. ............... 320/134

* cited by examiner

*Primary Examiner* — Lee Nguyen
(74) *Attorney, Agent, or Firm* — Leydig, Voit & Mayer, Ltd.

(57) ABSTRACT

The described method and system allows for the utilization of a telematics unit on a telematics-equipped vehicle to prevent the unauthorized discharge of a vehicle battery. A user may communicate an authorization request for allowing discharge of the vehicle battery through a telematics unit or telematics service provider (TSP) call center. If approved by the TSP call enter or telematics unit, an authorization, which may include an authorization code, is communicated to a charge controller which controls the discharge of the vehicle battery. Alternatively, the user may communicate an authorization code directly to the telematics unit which passes it on to the charge controller for approval.

17 Claims, 6 Drawing Sheets

SYSTEM AND METHOD FOR PROVIDING DISCHARGE AUTHORIZATION TO A BATTERY-POWERED VEHICLE VIA A TELEMATICS SYSTEM

BACKGROUND OF THE INVENTION

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

In tandem with the development of telematics resources, the technology utilized to store, manage, and consume power in electrically-powered vehicles has been improving steadily as well. Electrically-powered vehicles (hereinafter electric vehicles) are now competitive with fuel-powered vehicles on many performance parameters, and typically surpass fuel-powered vehicles in measures of efficiency, environmental cleanliness, and operating noise levels.

With fuel-powered vehicles, fuel can be siphoned from one vehicle and transferred to a second vehicle if the second vehicle has run out of fuel. Similarly, battery charge from one electric vehicle may be discharged and transferred to a second electric vehicle which has run out of battery charge. However, just as the unauthorized siphoning off of gasoline is a problem for fuel-powered vehicles, the unauthorized discharge of the vehicle battery may be a problem with electric vehicles.

Thus, it is an object in part to provide a system and method to utilize a vehicle's telematics unit to prevent discharge of a vehicle battery without a user's consent. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for utilizing a telematics unit on a telematics-equipped vehicle to prevent unauthorized discharge of a vehicle battery. To prevent unauthorized discharge of battery charge from a vehicle battery, such as the unauthorized transfer to another vehicle, the invention prevents battery charge from being extracted unless the driver has made an authorization via a telematics system. In one implementation, a vehicle may be equipped with a telematics unit and a charge controller that controls flow of current to and from the vehicle battery through a battery charging port. A user of the telematics unit may use the telematics unit to authorize the extraction of battery charge from the vehicle battery. In a further implementation, the telematics unit may send an authorization code to the charge controller, and the charge controller may not allow discharge of the vehicle battery unless it determines that a correct authorization code has been received.

In yet another further implementation, the telematics unit may not send an authorization code to the charge controller until after the TSP validates a user's authorization request for discharge of the vehicle battery and the TSP sends an authorization over a network to the telematics unit, which allows the telematics unit to send the authorization code to the charge controller.

In yet another further implementation, after battery discharge is authorized, the vehicle battery may be discharged until a predetermined condition is satisfied (e.g. the vehicle battery reaches a predetermined charge level or a predetermined amount of time elapses).

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for utilization of a telematics unit on a telematics-equipped vehicle to prevent the unauthorized discharge of a vehicle battery. A charge controller connected to the vehicle battery may interact with a telematics unit, which may communicate with a TSP through a TSP call center and interact with the user, to authorize and control the flow of current out of the vehicle battery.

Figure 1:
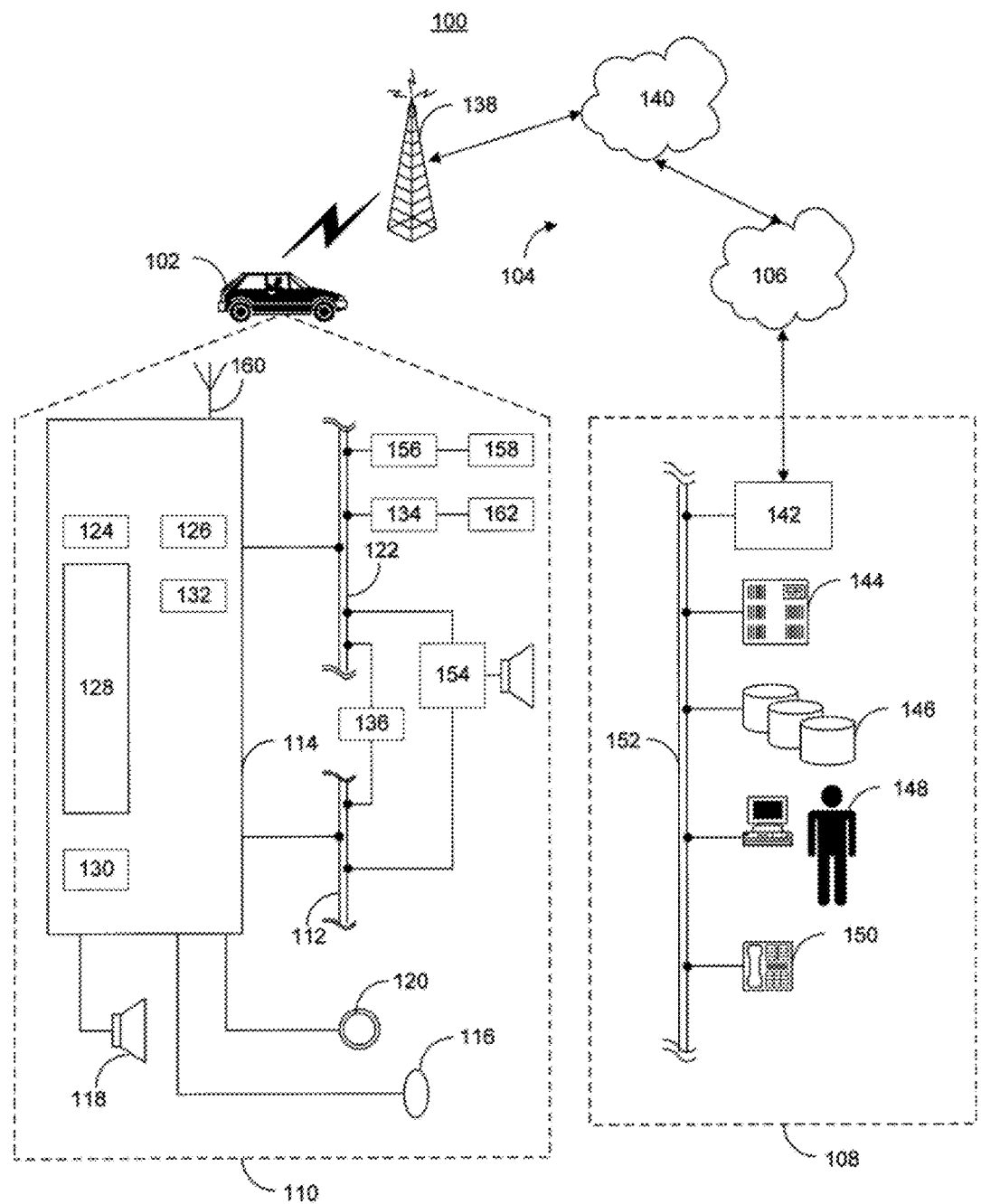
FIG. 1 is a schematic diagram of an operating environment for a mobile vehicle communication system usable in implementations of the described principles.

An exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
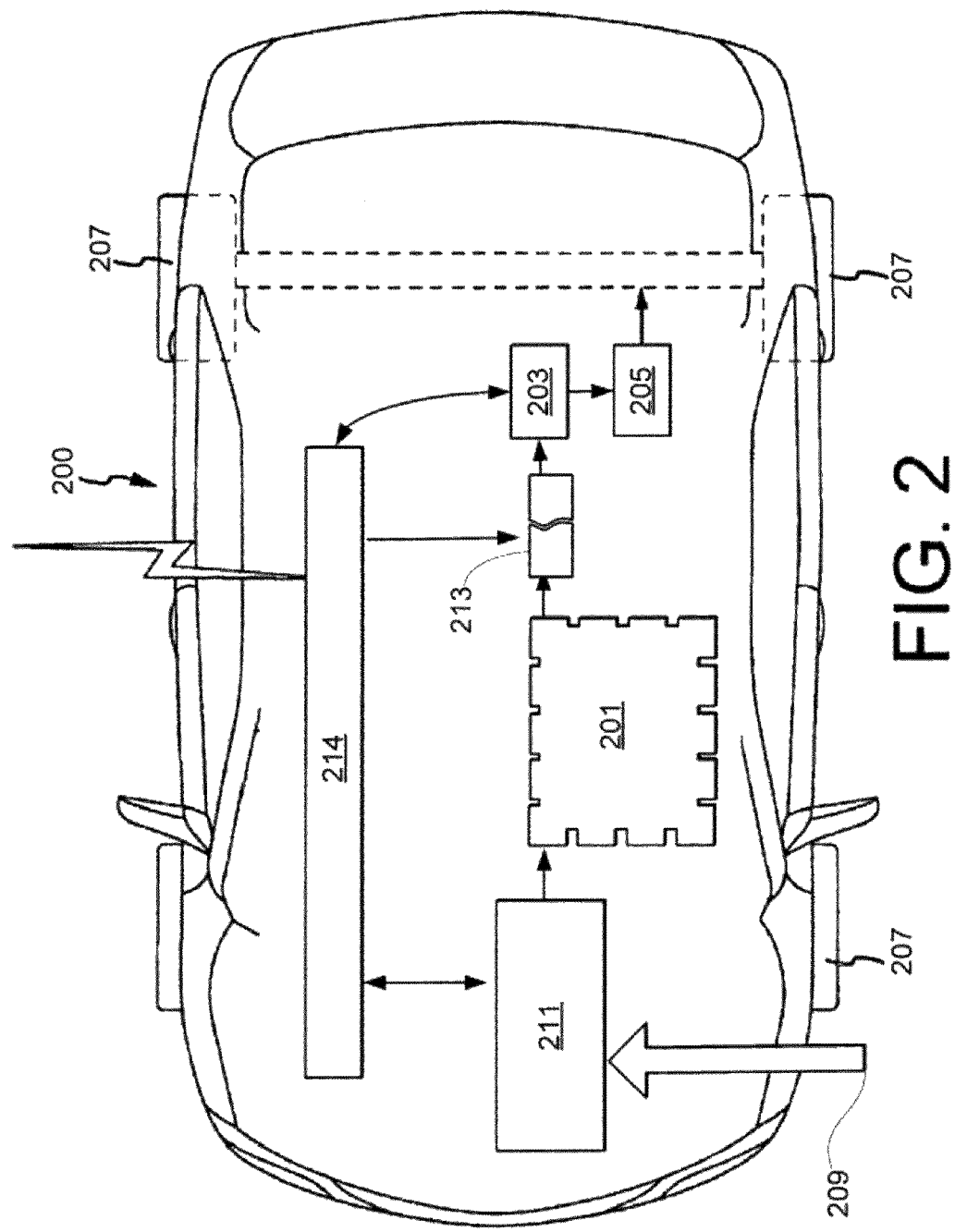
FIG. 2 is a schematic vehicle diagram showing relevant power links and communications linkages within the vehicle and between the vehicle and a remote entity.

As noted above, the telematics unit 114 and associated components are associated in an implementation of the invention with a vehicle 102. In particular, the vehicle 102 is a hybrid-electric or electric vehicle, bother referred to in generally as electric vehicles. FIG. 2 is a vehicle schematic showing the components of the vehicle of interest with the respect to the disclosed principles and the manner in which the components may be interrelated to execute those principles. It will be appreciated, however, that the illustrated architecture is merely an example, and that the disclosed principles do not require that the vehicle be configured precisely as shown.

In the illustrated example, the vehicle 200 (102) includes an electrical energy storage system 201 which is a battery or battery bank ("battery") of suitable voltage and capacity. Suitable battery types include but are not limited to lead acid batteries, Nickel Cadmium batteries (NiCd), Nickel Metal Hydride batteries (NiMH), Lithium Ion batteries and Lithium Polymer batteries.

The battery 201 is conductively linkable, e.g., via a motor controller 203, to an electrical drive unit 205, e.g., an electrical motor or motors. The electrical energy may be modulated, voltage-modified, or otherwise modified by the motor controller 203 as needed to drive the electrical drive unit 205. The electrical drive unit 205 is linked or linkable to a ground engaging drive, typically including one or more wheels 207.

In one implementation, a charging port 209 is provided in order to charge the battery 201. It will be appreciated that multiple types of charging ports may be used, including but not limited to plug-type architectures. The vehicle charging port 209 is linked to the battery 201 via a charge controller 211. The telematics unit 214 (114) is adapted to receive information from the controller 211 as discussed above and to thereby interact with the battery as will be discussed more fully hereinafter. An optional aspect of the vehicle 200 and battery 201 is the ability to electrically disconnect the battery 201 from the rest of the vehicle by controlling at least one and preferably two or more high voltage contactors 213 if an adverse condition is detected.

In an implementation, the responsibility for battery charge state sensing and analysis is vested in the charge controller 211. Alternatively, the charge controller 211 may be responsible for sensing battery charge state, while the telematics unit 214 is responsible for analysis of charge state.

The charge controller 211 may further be configured to generally allow current to flow through the vehicle charging port 209 without restriction to charge the battery, and to not allow current to flow to discharge the battery via the vehicle charging port unless the charge controller 211 receives authorization (e.g. an authorization code or a command to begin discharging the vehicle battery).

Figure 3:
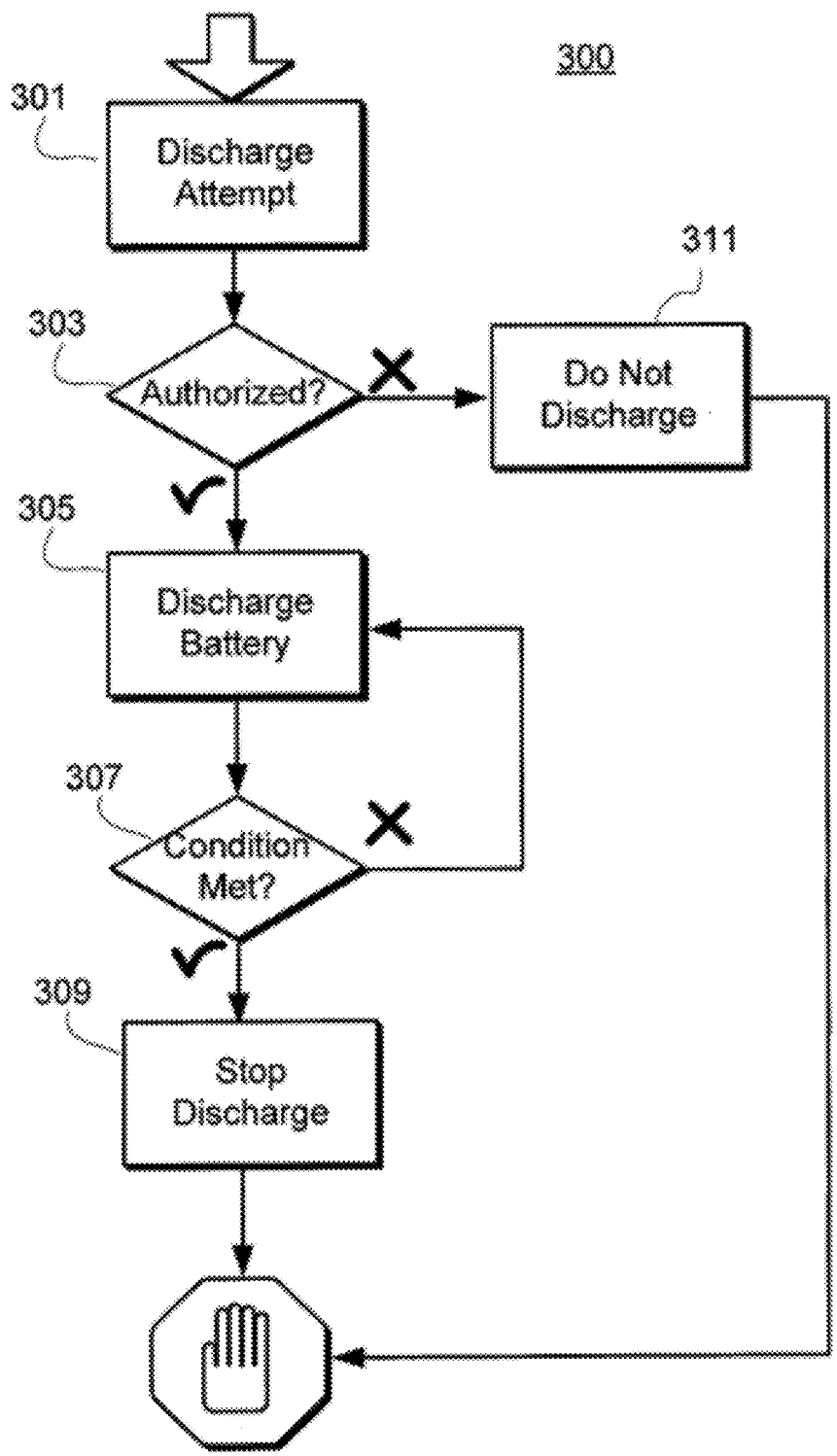
FIG. 3 is a flowchart illustrating a process for controlling the discharging of a vehicle battery in accordance with an implementation of the described principles.

With further reference to the architecture of FIGS. 1 and 2, and turning more specifically to FIG. 3, a process for utilizing a vehicle's telematics unit to control the discharge of a vehicle battery in an implementation is depicted. The telematics-equipped vehicle may be a plug-in type electric vehicle. However, one skilled in the art will appreciate that the inventive principles described herein may be applied to other types of telematics-equipped vehicles as well. To begin the discharge process of a vehicle battery, a discharge attempt 301 may be made. The discharge attempt may take a variety of forms, including but not limited to connecting the vehicle battery to a second vehicle's battery or other receptacle capable of receiving the vehicle battery's electrical charge, the telematics unit 114 or charge controller 211 detecting an attempt to extract charge from the vehicle battery, or a user communicating to the telematics unit that the user wishes to begin discharging the vehicle battery.

If the discharge attempt 301 is determined to be unauthorized 303, a TSP call center, the telematics unit, or the charge controller may prevent the vehicle battery from being discharged 311. If the discharge attempt 301 is determined to be authorized 303, the vehicle battery may be discharged 305 until a condition to stop discharging is met. While no condition is met 307, the vehicle battery continues to be discharged 305, and when a condition is met 307, the charge controller will stop the discharging 309. For example, if authorized, the vehicle battery may be discharged until the battery charge reaches a predetermined level, until a certain amount of time has elapsed, until a predetermined amount of charge has been extracted, until the charge controller receives a command to stop discharging, until the vehicle battery is unplugged or disconnected, or until the charge level of the second vehicle battery or other receptacle receiving the charge reaches a certain level. One skilled in the art will appreciate that the conditions listed above are merely examples and not an exhaustive list. It will also be appreciated that the discharge process may be subject to multiple conditions, such that the occurrence of one of the multiple conditions may stop the discharging process. The occurrence of a condition being met may be determined by the telematics unit or call center and communicated to the charge controller, or may be determined by the charge controller itself.

Figure 5:
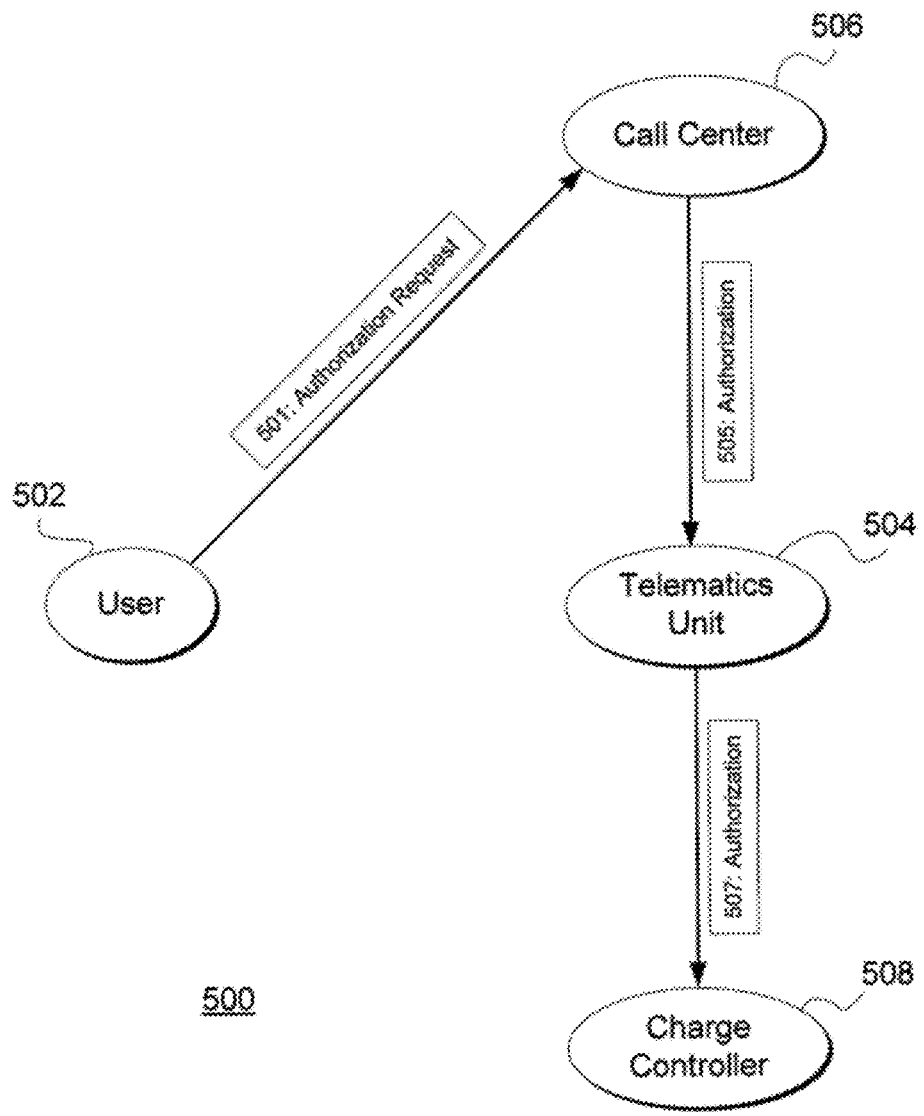
FIG. 5 is a flowchart illustrating the authorization part of the discharge process in another implementation.
Figure 6:
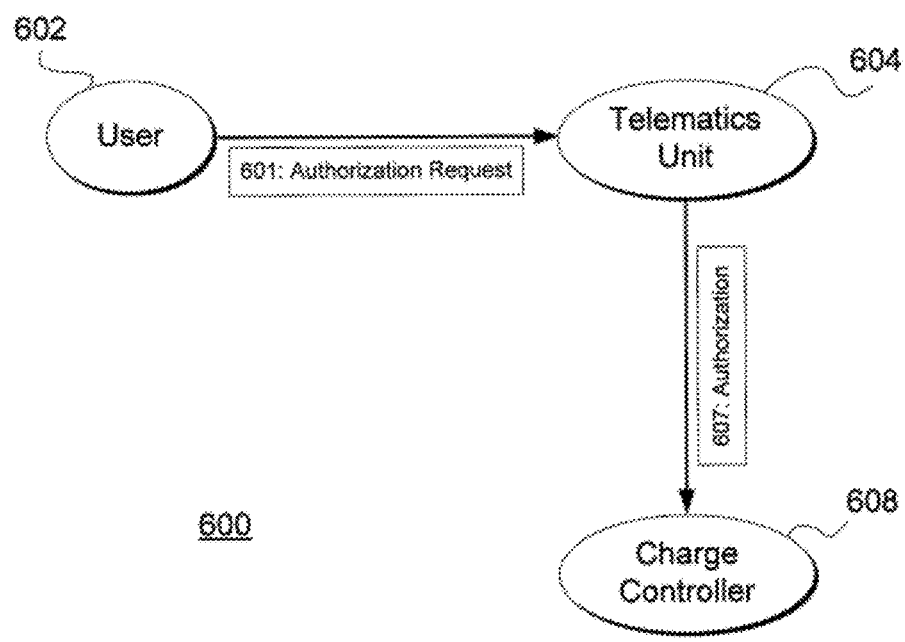
FIG. 6 is a flowchart illustrating the authorization part of the discharge process in yet another implementation.

Determining whether the discharge attempt 301 is authorized 303 may be performed in multiple ways. Different exemplary implementations of processes for authorizing a discharge attempt are depicted by FIGS. 4, 5 and 6.

Figure 4:
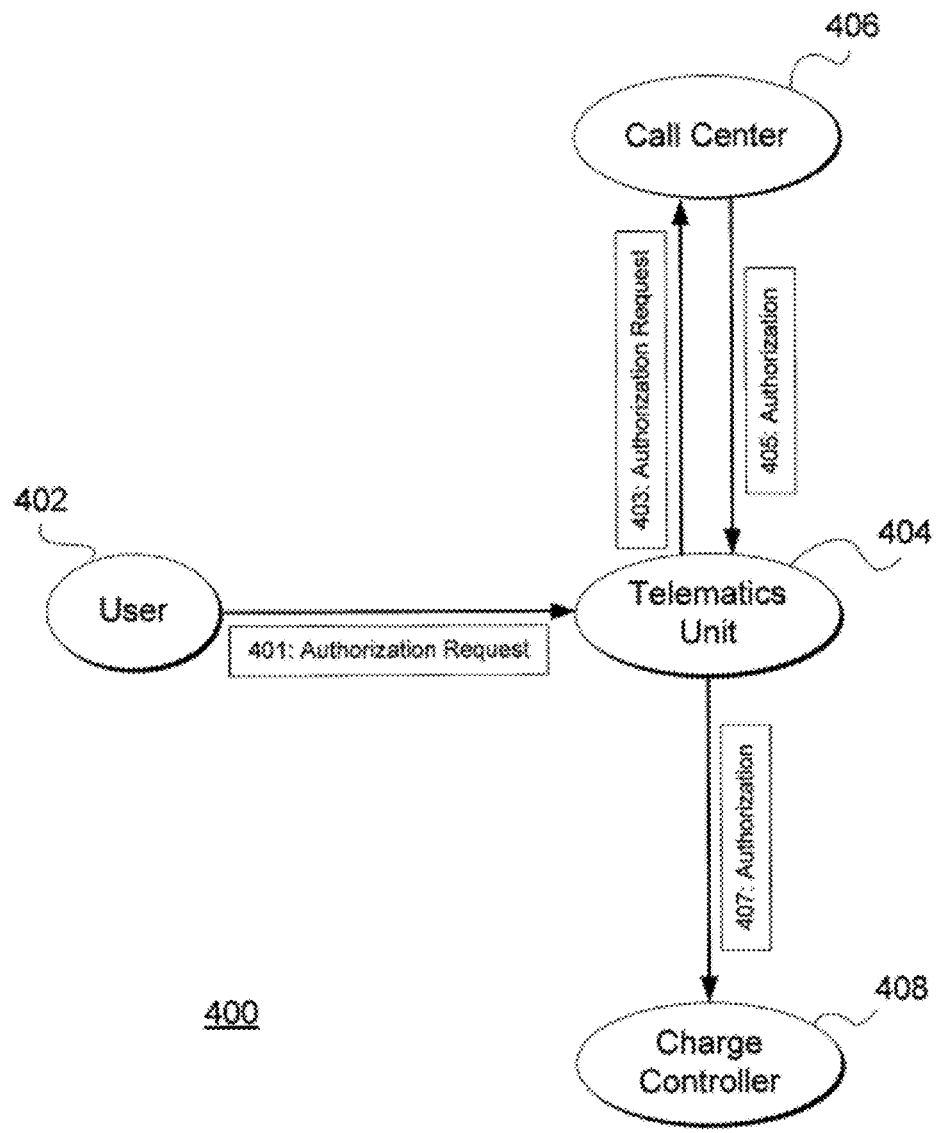
FIG. 4 is a flowchart illustrating the authorization part of the discharge process in an implementation.

Turning to FIG. 4, with further reference to the architecture of FIGS. 1 and 2 and within the context of the discharge process of FIG. 3, one implementation for performing an authorization to allow discharge of the vehicle battery is depicted. A user (i.e. a driver, owner, or other person appropriately associated with the vehicle) may send an authorization request 401 to allow discharge of the vehicle battery to the telematics unit 404 (114). The authorization request may be communicated to the telematics unit through a user interface of the telematics unit, such as through buttons, an interactive display, a microphone, and other ways the user may interact with the telematics unit (e.g. over a network through mobile applications or web applications). The authorization request may include an authorization code, information regarding the identity of the user, security information such as an identifier or a password, and other data that may be relevant to the authorization request. One skilled in the art will appreciate that the methods of communicating and the contents of the authorization request described herein are merely exemplary and that the present invention is not limited to the described implementations.

The telematics unit 404 may further communicate the authorization request 403 to a TSP call center 406. In a further implementation the TSP call center may approve or decline the discharge of the vehicle battery based on the information of the authorization request. For example, if the authorization request includes security information such as a password and the password is incorrect, the call center may decline to allow the discharging to begin. If the TSP call center approves the authorization request, the call center 406 may inform the telematics unit 404 that discharging the vehicle battery may be allowed 405.

The telematics unit 404 may then further communicate to the charge controller 408 (211) that the vehicle battery may be discharged. In a further implementation, the telematics unit 404 may communicate an authorization code to the charge controller 408, and if the charge controller determines that the authorization code is correct, the charge controller may allow the battery to be discharged. If the charge controller determines that the authorization code is incorrect, the charge controller may prevent the battery from being discharged. In further implementations, the authorization code may be a part of the communication from the user to the telematics unit 401, the communication from the telematics unit to the call center 403, or the communication from the call center to the telematics unit 405. The authorization code may be checked by the charge controller as described above, or may be checked by the call center or the telematics unit, and if approved, a command to begin discharging the vehicle battery may be sent to the charge controller rather than the authorization code.

It will be appreciated that the authorization request 401 communicated from the user 402 to the telematics unit 404 and authorization request 403 communicated from the telematics unit 404 to the call center 406 may include different or the same content. It will further be appreciated that authorization 405 communicated from the call center 406 to the telematics unit 404 and authorization 407 communicated from the telematics unit 404 to charge controller 408 may also include different or the same content.

Turning to FIG. 5, with further reference to the architecture of FIGS. 1 and 2 and within the context of the discharge process of FIG. 3, an alternative implementation for performing an authorization to allow discharge of the vehicle battery is depicted. The process is similar to the process described above relating to FIG. 4, except rather than communicating an authorization request 401 from the user 402 to the telematics unit 404 and then an authorization request 403 from the telematics unit 404 to the call center 406, the user 502 directly communicates an authorization request 501 to the call center 506. The user 502 may communicate with the call center 506 over a network such as a wireless network or other communications network. It will be appreciated that the authorization request 501 may be carried out in numerous ways, including but not limited to mobile applications, phone calls, web applications, etc.

After the call center 506 receives the authorization request 501, the call center may approve or decline the request, and if approved, may communicate an authorization 505 to the telematics unit 504, which communicates an authorization 507 further to the charge controller 508, similar to the process described above relating to FIG. 4.

Turning to FIG. 6, with further reference to the architecture of FIGS. 1 and 2 and within the context of the discharge process of FIG. 3, yet another alternative implementation for performing an authorization to allow discharge of the vehicle battery is depicted. The user 602 may directly send an authorization request 601 to the telematics unit 604. The telematics unit 604 may then determine whether to approve or decline the discharging of the vehicle battery. If approved, the telematics unit 604 may send an authorization 607 to the charge controller 608. In a further implementation, the authorization 607 may include an authorization code.

In yet another further implementation, the user 602 may send an authorization code to the telematics unit 604, which passes on the authorization code to the charge controller 608, and the charge controller 608 may determine whether the authorization code is correct or not. If correct, the charge controller 608 may allow the vehicle battery to be discharged.

In yet another further implementation, the user 602 may simply send a command to the telematics unit 604 to allow the discharge of the vehicle battery, and the telematics unit 604 may command the charge controller 608 to begin discharging the vehicle battery.

It will be appreciated that the described system and method allows for utilization of a telematics unit on a telematics-equipped vehicle to prevent the unauthorized discharge of a vehicle battery. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for preventing unauthorized discharge of a battery on a telematics-equipped vehicle, the method comprising:
   transmitting, by a telematics unit, an authorization request to a call center;
   receiving, by the telematics unit, in response to the authorization request, an authorization from the call center to allow discharge of a vehicle battery;
   communicating, to a charge controller, that discharge of the vehicle battery is authorized; and
   discharging, by the charge controller, the vehicle battery.

2. The method of claim 1, wherein the authorization request is based on user input.

3. The method of claim 1, wherein the authorization request includes security information that the call center utilizes to approve the request.

4. The method of claim 3 wherein the authorization request transmitted to the call center includes an authorization code.

5. The method of claim 1, wherein the communication from the telematics unit to the charge controller includes an authorization code.

6. The method of claim 5, the method further comprising:
   determining, by the charge controller, that the authorization code is correct, wherein the determining occurs before the discharging of the vehicle battery by the charge controller.

7. The method of claim 1, the method further comprising:
   stopping, by the charge controller, the discharging of the vehicle battery when a predetermined condition is met.

8. The method of claim 7, wherein the predetermined condition includes at least one of:
   the charge of the vehicle battery reaching a predetermined charge level;
   a predetermined amount of time elapsing since the beginning of the discharging;
   the charge extracted from the battery reaching a predetermined amount;
   the charge controller receives a command to stop discharging; or
   a charging port of the vehicle battery being disconnected.

9. The method of claim 1, wherein the telematics-equipped vehicle is a plug-in type electric vehicle.

10. The method of claim 1, wherein the authorization received by the telematics unit includes an authorization code.

11. The method of claim 10, the method further comprising:
   determining, at the telematics unit, that the authorization code is correct, wherein the determining occurs before the communicating, to a charge controller, that discharge of the vehicle battery is authorized.

12. A system for preventing unauthorized discharge of a vehicle battery on a telematics-equipped vehicle, the system comprising:
   a call center, adapted to receive an authorization request to allow the discharging of the vehicle battery and to approve the authorization request based on the content of the authorization request;
   a vehicle equipped with a telematics unit, the telematics unit being adapted to receive an authorization from the call center to allow the discharging of the vehicle battery and to communicate the authorization to a charge controller; and
   the charge controller, adapted to receive the authorization from the telematics unit and to control flow of charge out of the vehicle battery.

13. The system of claim 12, wherein the telematics unit further comprises a user interface adapted to receive the authorization request from a user.

14. The system of claim 12, wherein the authorization communicated to the charge controller includes an authorization code and the charge controller is further adapted to determine if the authorization code is correct.

15. A method for preventing unauthorized discharge of a battery on a telematics-equipped vehicle, the method comprising:
   receiving, by a call center, an authorization request to allow discharge of a vehicle battery from a telematics unit;
   approving, by the call center, the authorization request based on the content of the authorization request; and
   transmitting the authorization to the telematics unit, so as to cause the vehicle battery to be discharged.

16. The method of claim 15, wherein the authorization request includes security information that the call center utilizes to approve the request.

17. The method of claim 15, wherein the authorization request includes an authorization code, and the call center approves the authorization request if the call center determines that the authorization code is correct.

* * * * *